(12) United States Patent
Kim

(10) Patent No.: US 7,948,707 B2
(45) Date of Patent: May 24, 2011

(54) MAGNETIC RECORDING MEDIUM, METHOD OF RECORDING SERVO PATTERN ON MAGNETIC RECORDING MEDIUM, AND MAGNETIC HEAD

(75) Inventor: Yong-su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 11/937,269

(22) Filed: Nov. 8, 2007

(65) Prior Publication Data

US 2008/0310053 A1   Dec. 18, 2008

(30) Foreign Application Priority Data

Jun. 13, 2007   (KR) .................. 10-2007-0058007

(51) Int. Cl.
*G11B 5/596* (2006.01)
(52) U.S. Cl. ................................... 360/77.08
(58) Field of Classification Search .................. None
See application file for complete search history.

(56) References Cited

U.S. PATENT DOCUMENTS

| | | | |
|---|---|---|---|
| 7,345,838 B2 * | 3/2008 | Sakurai et al. | 360/48 |
| 7,352,526 B2 * | 4/2008 | Takaishi | 360/77.08 |
| 7,416,991 B2 * | 8/2008 | Bandic et al. | 438/717 |
| 7,430,086 B2 * | 9/2008 | Izumi | 360/55 |
| 7,440,222 B2 * | 10/2008 | Nakamura et al. | 360/77.04 |
| 2007/0217075 A1 * | 9/2007 | Kamata et al. | 360/135 |
| 2008/0002295 A1 * | 1/2008 | Sakurai et al. | 360/131 |

FOREIGN PATENT DOCUMENTS

KR   1020070097316 A   10/2007

* cited by examiner

*Primary Examiner* — Hoa T Nguyen
*Assistant Examiner* — James L Habermehl
(74) *Attorney, Agent, or Firm* — Sughrue Mion, PLLC

(57) ABSTRACT

A magnetic recording medium includes a disk substrate and a magnetic recording layer formed on one surface or both surfaces of the disk substrate. The magnetic recording layer includes at least one pattern area forming a plurality of data tracks in which a position for magnetic recording is patterned with a magnetic body and at least one continuous area formed of a continuous magnetic body, and at least a part of a servo pattern for following the data track is recorded in the continuous area. A method of recording a servo pattern on a magnetic recording medium includes determining a center position of the data track and a start position of the continuous area and recording a servo pattern for following the data track in the continuous area with respect to center position of the data track and the start position of the continuous area. A magnetic head for recording a servo pattern on a magnetic recording medium includes a data writing head for recording data, a servo writing head for recording the servo pattern, and a reading head for reproducing the data.

14 Claims, 15 Drawing Sheets

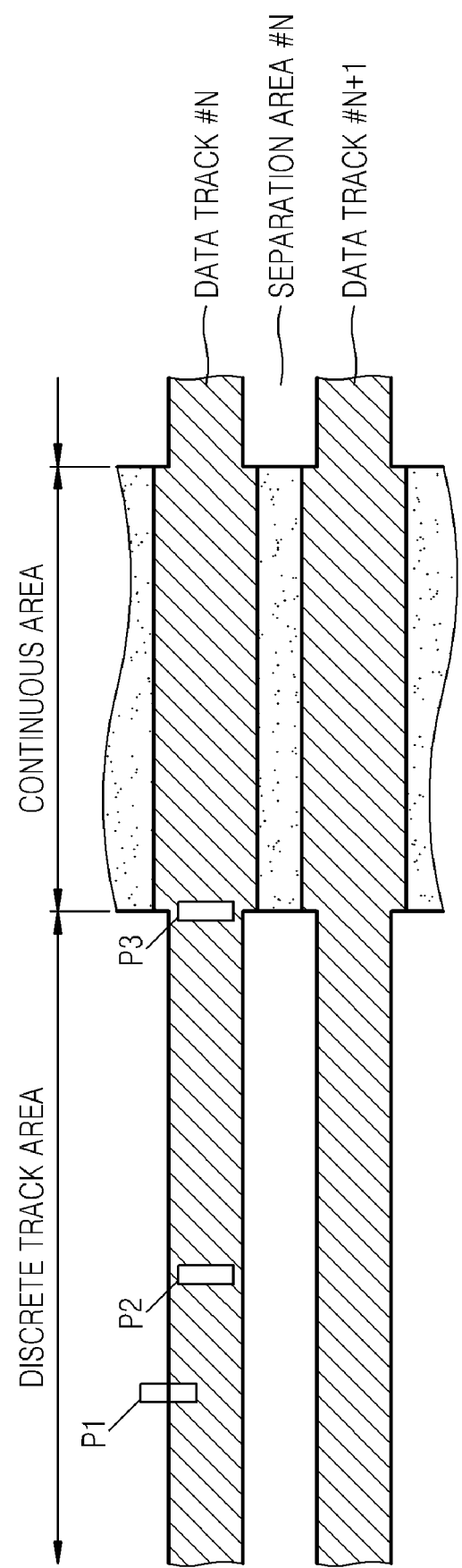

MAGNETIC RECORDING MEDIUM, METHOD OF RECORDING SERVO PATTERN ON MAGNETIC RECORDING MEDIUM, AND MAGNETIC HEAD

CROSS-REFERENCE TO RELATED PATENT APPLICATIONS

This application claims the benefit of Korean Patent Application No. 10-2007-0058007, filed on Jun. 13, 2007, in the Korean Intellectual Property Office, the disclosure of which is incorporated herein in its entirety by reference.

BACKGROUND OF THE INVENTION

1. Field of the Invention

The present invention relates to magnetic recording media, a method of recording a servo pattern on magnetic recording media, and a magnetic head for recording a servo pattern on magnetic recording media, and more particularly, to a magnetic recording medium appropriate for recording thereon a servo pattern when a position where user data is recorded is patterned, a method of recording a servo pattern on the magnetic recording medium, and a magnetic head appropriate for recording a servo pattern on the magnetic recording medium.

2. Description of the Related Art

Recently, information memory devices for recording/reproducing high-density information are required due to the rapid increase in the amount of information to be processed. In particular, hard disk drives using magnetic recording media have characteristics such as large storage capacity and fast access time. Accordingly, the hard disk drives have been highlighted as information memory devices for various digital devices as well as computers.

However, in the case of magnetic recording media having a continuous magnetic recording layer (hereinafter, referred to as continuous media), when the size of a bit that is the minimum recording unit of data or the pitch width of a data track is reduced to a certain limit, noise increases and the recording stability is rapidly degraded due to the effect of a neighboring area. Thus, there is a limit in increasing the recording density by increasing a linear recording density or a BPI (bits per inch), that is, a density in a disk rotational direction, or a track density or a TPI (tracks per inch), that is, a density in a disk radial direction.

Discrete track media and patterned media on which the position for magnetic recording is patterned in advance in the manufacturing step have been studied in order to incease the recording density. The discrete track media have a structure in which a gap between data tracks is empty or filled with a non-magnetic material. Also, the patterned media have a structure in which a bit, that is, the minimum recording unit, is patterned in a shape of an island and the outside of the island is empty or filled with a non-magnetic material. However, it is difficult to apply a servo method and system, which are used for continuous media, to discrete track media and patterned media.

One of the servo methods used for continuous media is the sector servo method. In the sector servo method, a magnetic recording medium includes a data area and a servo area for each sector, and servo information to allow a magnetic head to be correctly located at a desired position on the magnetic recording medium is recorded in the servo areas. In particular, a servo pattern is formed in the servo areas so that the magnetic head can correctly follow a data track on the magnetic recording medium. In the case of continuous media, the servo pattern includes a burst that is partially deviated from a regular position on the data track. However, in the case of discrete track media or patterned media, since the position for magnetic recording is patterned in advance in the manufacturing step, the magnetic recording is not performed in an area other than a preset position. Thus, since the burst pattern is not formed at a position partially deviated from a track, it is difficult to apply the servo pattern used for the continuous media to the discrete track media and patterned media.

Furthermore, for the continuous media, the servo pattern that is first written provides a reference position of a data track when data is recorded and allows the detection of a degree of deviation of the magnetic head from the data track when the data is reproduced. However, since in the discrete track media and patterned media the data track is determined in advance in the manufacturing step, it is difficult to apply the servo method used to the continuous media.

SUMMARY OF THE INVENTION

To address the above servo pattern write problem that can be generated in magnetic recording media such as discrete track media and patterned media, the present invention provides magnetic recording media which can employ a servo pattern and a servo method used for conventional continuous media without much change, a method of recording a servo pattern on the magnetic recording media, and a magnetic head a for recording a servo pattern on the magnetic recording media.

According to an aspect of the present invention, a magnetic recording medium comprises a disk substrate and a magnetic recording layer formed on one surface or both surfaces of the disk substrate, wherein the magnetic recording layer includes at least one pattern area forming a plurality of data tracks in which a position for magnetic recording is patterned with a magnetic body and at least one continuous area formed of a continuous magnetic body, and at least a part of a servo pattern for following the data track is recorded in the continuous area.

According to another aspect of the present invention, there is provided a method of recording a servo pattern on a magnetic recording medium having at least one pattern area forming a plurality of data tracks where a position for magnetic recording is patterned in a magnetic body and at least one continuous area formed of a continuous magnetic body, the method comprises determining a center position of the data track and a start position of the continuous area, and recording a servo pattern for following the data track in the continuous area with respect to center position of the data track and the start position of the continuous area.

According to another aspect of the present invention, there is provided a magnetic head for recording a servo pattern on a magnetic recording medium having at least one pattern area forming a plurality of data tracks where a position for magnetic recording is patterned in a magnetic body and at least one continuous area formed of a continuous magnetic body, the magnetic head comprising a data writing head for recording data, a servo writing head for recording the servo pattern, and a reading head for reproducing the data and the servo pattern.

BRIEF DESCRIPTION OF THE DRAWINGS

The above and other features and advantages of the present invention will become more apparent by describing in detail preferred embodiments thereof with reference to the attached drawings in which:

FIG. 11A illustrates the positional relation between a magnetic head and a magnetic recording medium whereon a pre-pattern is written;

DETAILED DESCRIPTION OF THE INVENTION

Figure 1:
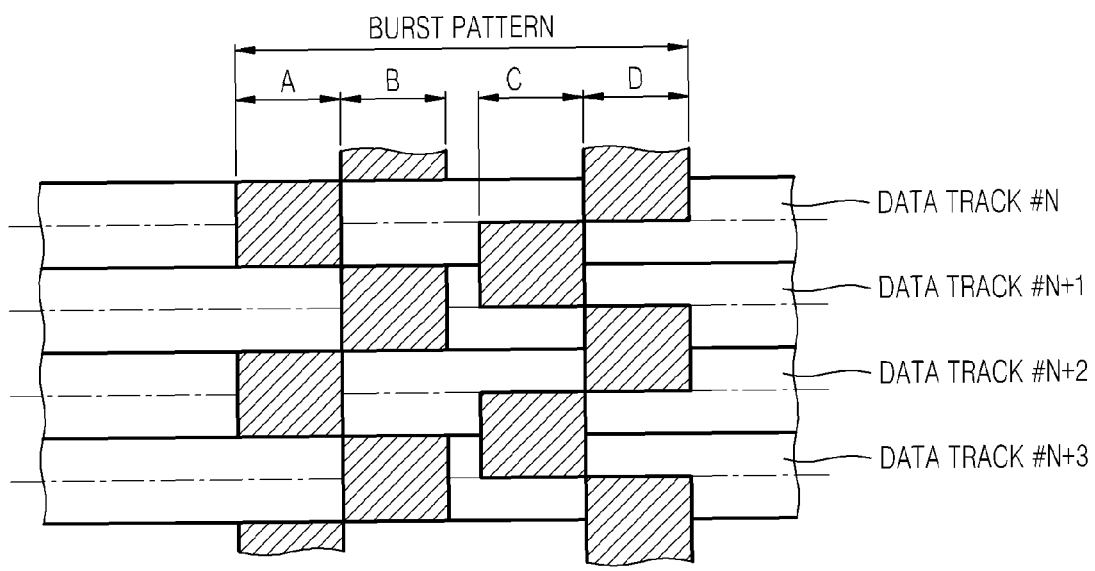
FIG. 1 illustrates an example of a servo pattern applied to a continuous medium.

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings. Like reference numerals in the drawings denote like elements. The size of each constituent element in the drawings can be exaggerated for clarity and convenience of explanation.

Figure 2:
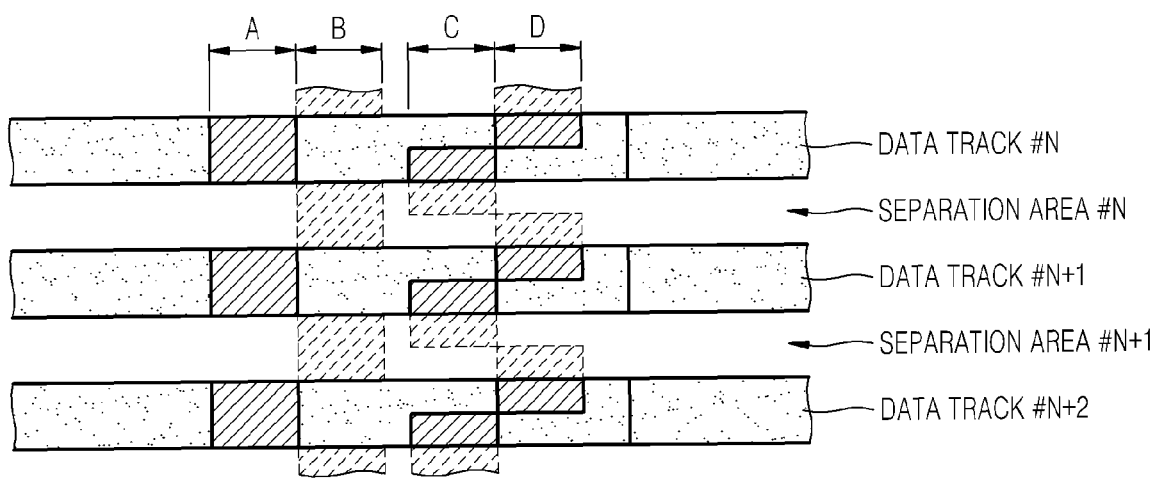
FIG. 2 illustrates a case where the servo pattern of FIG. 1 is applied to a discrete track medium as it is.
Figure 3:
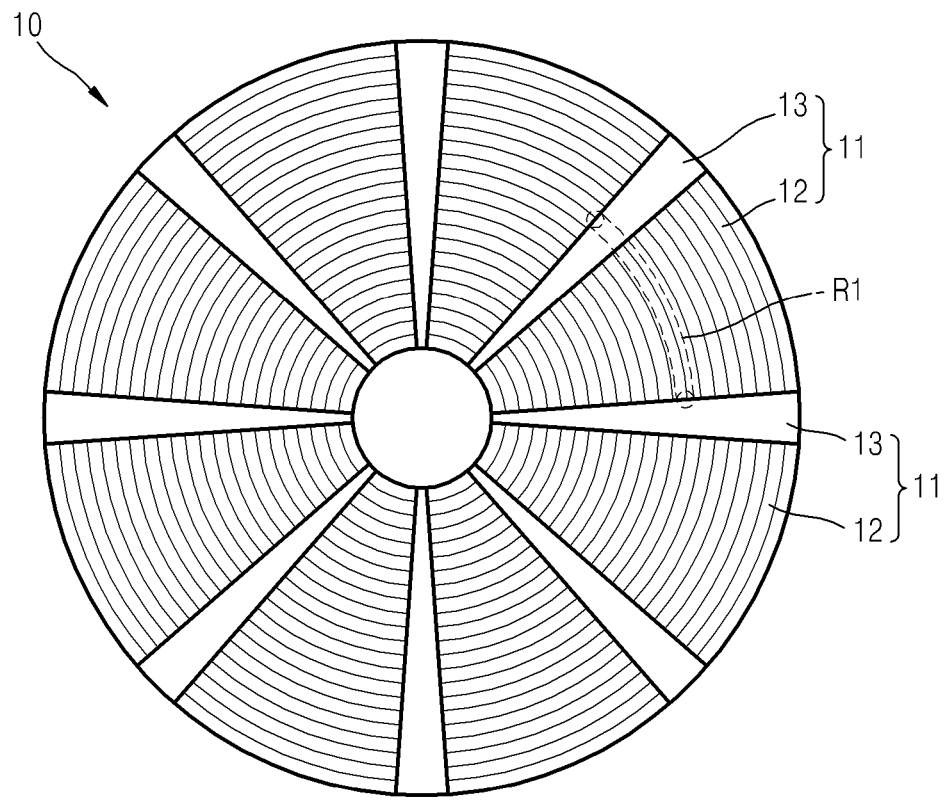
FIG. 3 illustrates the physical structure of a magnetic recording medium according to an embodiment of the present invention.

First, referring to FIGS. 1 through 3, a problem occurring when a servo pattern used for continuous media is applied to discrete track media according to an embodiment of the present invention is described.

FIG. 1 illustrates an example of a servo pattern applied to a continuous medium. In FIG. 1, only four tracks are illustrated for the convenience of explanation and other servo information provided in a data area or servo area is not illustrated. Also, in FIG. 1, "N" indicates an arbitrary number for numbering tracks. Referring to FIG. 1, the servo area of a continuous medium includes a burst pattern section on which bursts are recorded. The burst pattern section includes, for examples, a section A, a second B, a section C, and a section D, on which A burst, B burst, C burst, and D burst respectively recorded. The A burst is formed at regular positions of tracks #N and #N+2. The B burst is formed at regular positions of neighboring tracks #N+1 and #N+3. Further, the C burst is formed deviated from regular positions across both of the tracks #N and #N+1 and both of the tracks #N+2 and #N+3. The D burst is formed deviated from a regular position across both of the tracks #N+1 and #N+2.

The present inventor found that when a burst pattern used for the continuous media is applied to discrete track media, the burst pattern is not completely recorded due to the area between data tracks where magnetic recording is not possible.

FIG. 2 illustrates a case where the servo pattern of FIG. 1 is applied to a discrete track medium as it is. Referring to FIG. 2, the discrete track medium includes a plurality of data tracks and a plurality of separation areas that magnetically separate the data tracks. The data track is an area made of a magnetic material where magnetic recording is performed. The separation area is an empty area or an area filled with a non-magnetic material where magnetic recording is not possible. For the convenience of explanation, it is assumed that the width of the separation area that magnetically separates the data tracks is the same as that of the data track. Also, in FIG. 2, only three data tracks and two separation areas interposed between the data tracks are illustrated.

When a servo recording step of writing the burst pattern of FIG. 1 to the discrete track medium as it is is performed, as shown in FIG. 2, only a burst indicated by a solid line hatching is formed and a burst indicated by a dotted line hatching is not formed. That is, while the A burst formed at the regular positions of each of the data tracks #N, #N+1, and #N+2 of the section A is normally recorded, the B burst formed at each of the separation tracks #N and #N+1 of the section B is not normally recorded because the separation areas #N and #N+1 are areas where magnetic recording is not possible. When the C burst formed in the section C is to be recorded across both of the data track #N and the separation area #N, since the separation area #N is an area where the magnetic recording is not possible, only a part of the C burst is recorded on the data track #N. Likewise, when the D burst formed in the section D is to be recorded across both of the separation area #N and the data track #N+1, since the separation area #N is an area where the magnetic recording is not possible, only a part of the D burst is recorded on the data track #N+1.

When the burst pattern used for the continuous media is applied to the discrete track media as it is, since only a part of the burst pattern is formed, the burst pattern does not work properly. The same problem occurs in the case of the patterned media in which a bit that is the minimum data recording unit is formed in a pattern. That is, since magnetic recording is performed only for a bit formed at a regular position, when the burst pattern used for the continuous media is applied to the patterned media as it is, a burst is not formed in the separation area between bits.

Figure 4:
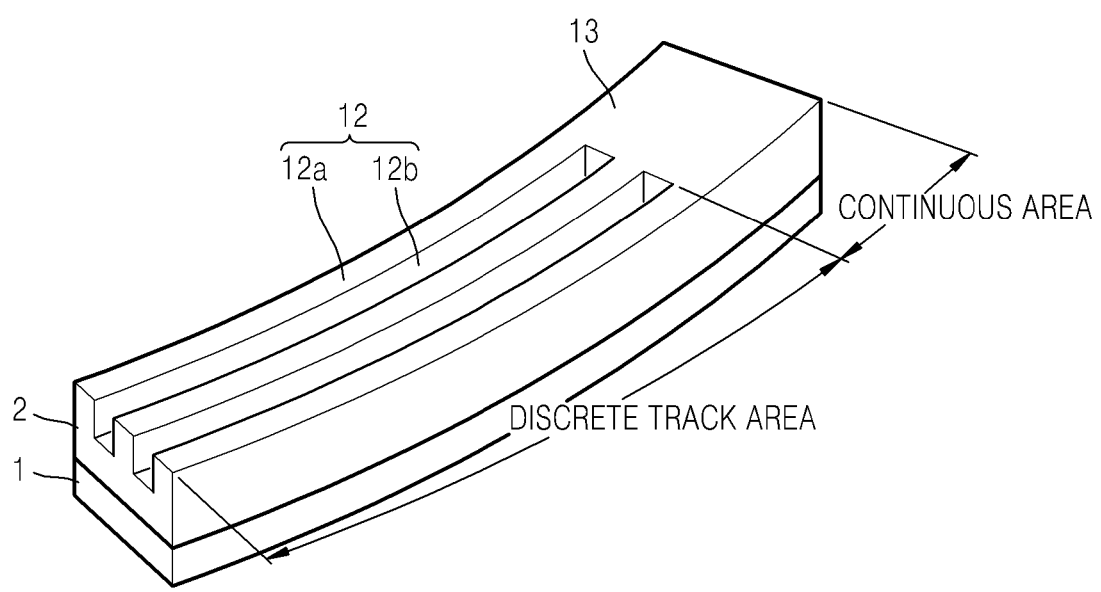
FIG. 4 is a partially enlarged perspective view of area R1 of FIG. 3.
Figure 5:
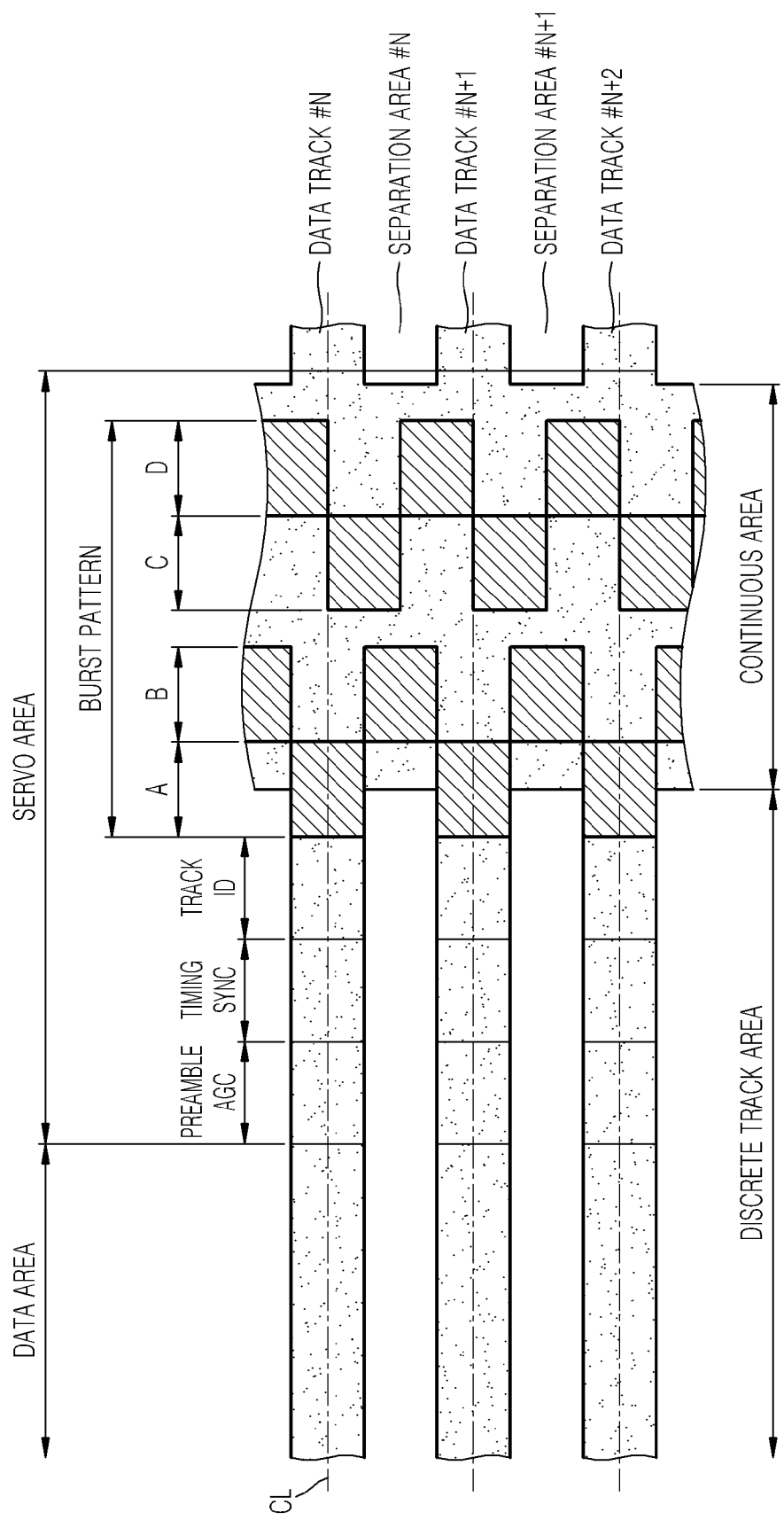
FIG. 5 illustrates the data structure of the magnetic recording medium of FIG. 3.

Next, referring to FIGS. 3 through 5, a magnetic recording medium according to an embodiment of the present invention is described. FIG. 3 illustrates the physical structure of a magnetic recording medium 10 according to an embodiment of the present invention. FIG. 4 is a partially enlarged perspective view of the area R1 of FIG. 3.

Referring to FIGS. 3 and 4, the magnetic recording medium 10 according to the present embodiment includes a disk substrate 1 and a magnetic recording layer 2 formed on at least one surface of the disk substrate 1. The magnetic recording layer 2 includes a plurality of sectors 11 which are divided equiangularly with respect to the center of the disk substrate 1. Each of the sectors 11 includes a discrete track area 12 and a continuous area 13.

The discrete track area 12 includes a plurality of data tracks 12a to which user data is written and a plurality of separation areas 12b which magnetically separate each of the data tracks 12a. The data tracks 12a are magnetically separated in a radial direction of the disk substrate 1 and formed of a continuous magnetic body in a circular downtrack direction. The width of the data track 12a can be several to tens of nanometers. The separation area 12b is an area to magnetically separate the data track 12a and can be empty or filled with a non-magnetic material. Te discrete track area 12 minimizes the magnetic effect between neighboring data tracks 12a to increase a recording density.

FIG. 5 illustrates the data structure of the magnetic recording medium of FIG. 3. In detail, FIG. 5 shows a recording surface of a magnetic recording layer in which a servo pattern is written. Referring to FIG. 5, the recording surface of the magnetic recording layer includes a data area and a servo area. The servo area includes a continuous area 13 (as shown in FIG. 3) and a part of a discrete track area 12 (as shown in FIG. 3). The data area includes the remaining part of the discrete track area 12. For the convenience of explanation, neighboring data tracks are numbered as data tracks #N, #N+1, and #N+2 and the separation area located between the neighboring data tracks are indicated as the separation areas #N and #N+1. Here, the N is an arbitrary natural number. In the present embodiment, the width of the separation area is the same as that of the data track.

Pre-servo pattern information and a servo pattern are written to the servo area. The servo pattern is arranged, for example, at a predetermined interval in a crosstrack direction and can be a burst pattern formed of a plurality of bursts, which deviate from each other in a downtrack direction. As shown in FIG. 5, the burst pattern includes the A, B, C, and D bursts. In the present embodiment, the burst pattern is formed not only in the continuous area but also across a part of the discrete track area. That is, the section A where the A burst is formed is across the discrete track area and the continuous area and the sections B, C, and D where the other B, C, and D bursts are formed are formed in the continuous area.

In detail, the A burst is recorded from an end portion of the data track adjacent to the continuous area to a part of the continuous area. The B burst is recorded in the section B to deviate from the A burst in the crosstrack direction as much as the width of the data track. That is, the B burst is formed in an area of the section B where the separation area extends to the continuous area. The C burst deviates from the B burst in the crosstrack direction as much as half of the track width at a position where the data track extends. The D burst deviates from the C burst as much as the track width in the crosstrack direction.

Referring to FIG. 5, for example, the C burst is formed in the section C at a position where the half track of the data track #N and the half track of the separation area #N extend to the continuous area. The D burst is formed in the section D at a position where the half track of the separation area #N and the half track of the data track #N+1 extend to the continuous area. In the present embodiment, although the burst pattern includes four bursts, i.e., A, B, C, and D bursts, the present invention is not limited thereto. In the present invention, the burst pattern can be formed of only the A burst and the B burst or only the C burst and the D burst. Other various patterns used for the continuous media can be adopted as a burst pattern.

The pre-servo pattern information can include at least one of preamble auto gain control (AGC), timing sync, and track ID. The preamble AGC is provided to determine a gain through a predetermined timing margin and gain control by providing a gap before a servo sector. The timing sync indicates the start of the servo sector. The track ID provides information about a track. The pre-servo pattern information can also include information about one turn of a disk or information about a sector.

The discrete track area 12 (as shown in FIG. 4) according to the present embodiment is an example of a pattern area in which a position for magnetic recording is patterned on a magnetic body, but the present invention is not limited thereto. For example, the discrete track area can be patterned in unit of bits as described later. Also, in the present embodiment, although the pattern area 12 and the continuous area 12 are formed in each of a plurality of the sectors 11 as shown in FIG. 3, the present invention is not limited thereto. For example, a recording surface of the magnetic recording medium can be divided into a pattern area and a continuous area.

In FIG. 4, for the convenience of explanation, an example where the magnetic recording layer 2 is formed on a surface of the disk substrate 1 is described, but the present invention is not limited thereto. The magnetic recording layer 2 can be formed on both surfaces of the disk substrate 1. Also, a variety of layers to improve a signal characteristic of the magnetic recording layer 2 can be interposed between the substrate 1 and the magnetic recording layer 2. A protective layer (not shown) and a lubrication layer (not shown) can be formed on the upper surface of the magnetic recording layer 2.

Figure 6:
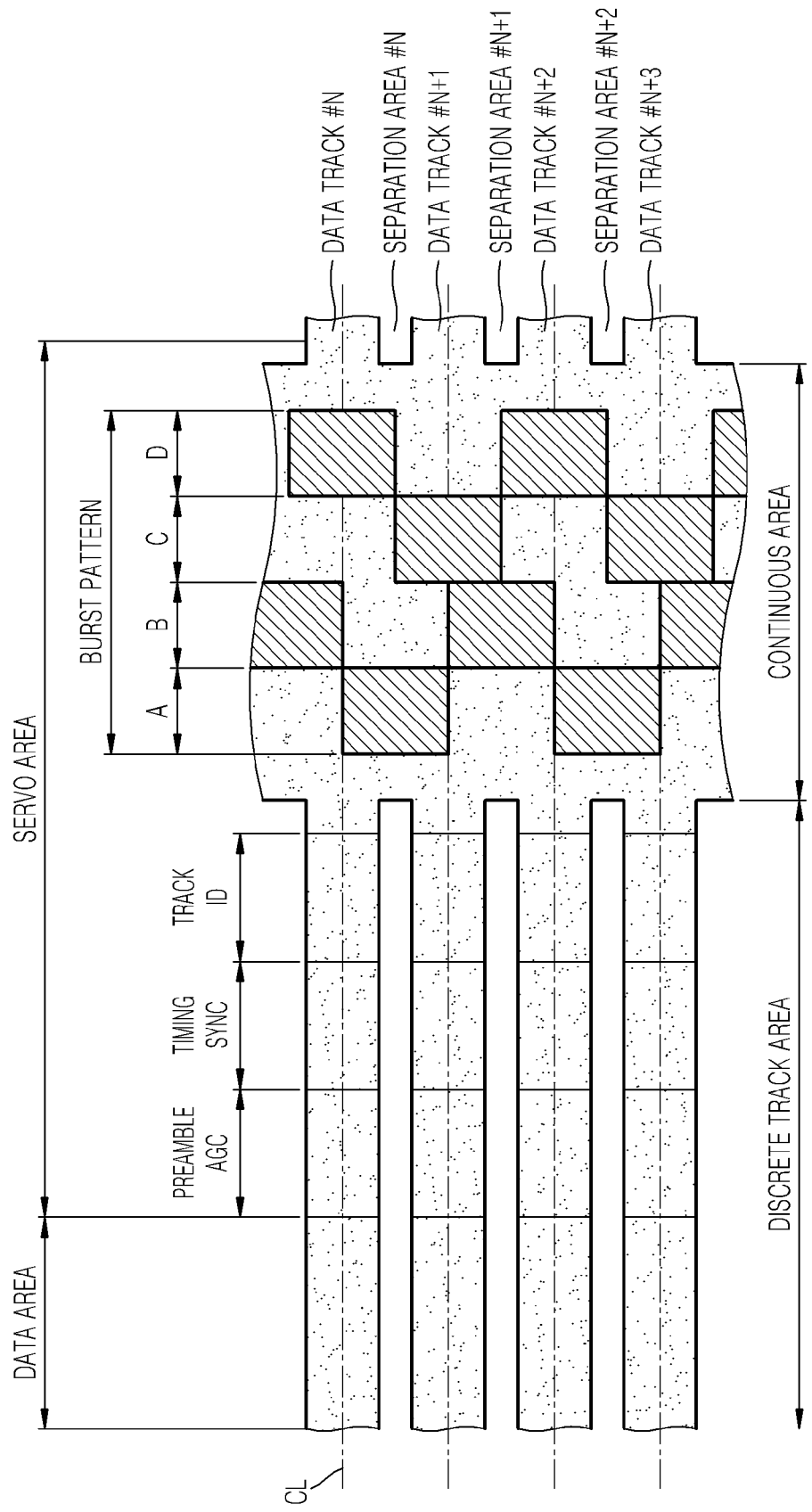
FIG. 6 illustrates a modified example of the data structure of the magnetic recording medium of FIG. 3.

Furthermore, in the present embodiment, the width of the separation area is the same as that of the data track, but the present invention is not limited thereto. FIG. 6 illustrates a magnetic recording medium according to another embodiment of the present invention. Referring to FIG. 6, the physical structure of the magnetic recording medium is substantially the same as that of the magnetic recording medium according to the previous embodiment except that the width of the separation area that magnetically separates the data tracks is less than that of the data track. The basic data structure of the magnetic recording medium according to the present embodiment is substantially the same as the data structure described with reference to FIG. 5 for the remaining portion except for the servo pattern.

That is, the magnetic recording medium according to the present embodiment can be divided into a data area and a servo area. The servo area includes a continuous area and a part of a discrete track area. The data area consists of the remaining part of the discrete track area. The servo area includes a pre-servo pattern information consisting of a preamble auto gain control (AGC), timing sync, and track ID, and a servo pattern.

The servo pattern according to the present embodiment is arranged, for example, in a crosstrack direction at a predetermined interval and can be a burst pattern formed of a plurality of bursts arranged deviated from one another in a downtrack direction. As shown in FIG. 6, the burst pattern includes A, B, C, and D bursts. The burst pattern according to the present embodiment is formed in a continuous area. That is, sections A, B, C, and D where the A, B, C, and D bursts are respectively formed are located within the continuous area. For example, the A burst is formed in the section A between the center line CL of the data track #N and the center line CL of the data track #N+1. The B burst is formed in the section B between the center line CL of the data track #N+1 and the center line CL of the data track #N+2. The C burst is formed in the section C deviated from the B burst in a crosstrack direction as much as a half track pitch. The D burst is formed in the section D deviated from the C burst in the crosstrack direction as much as a track pitch. The width of each of the A, B, C, and D bursts is the pitch width of the data track, that is, the distance between the center lines CLs of the neighboring data tracks. Although in the present embodiment the burst pattern is formed of four of the A, B, C, and D bursts, the present invention is not limited thereto. For example, the burst pattern can be formed of A burst and B burst only. Other various patterns used for the continuous media can be adopted as the burst pattern of the present embodiment.

Figure 7:
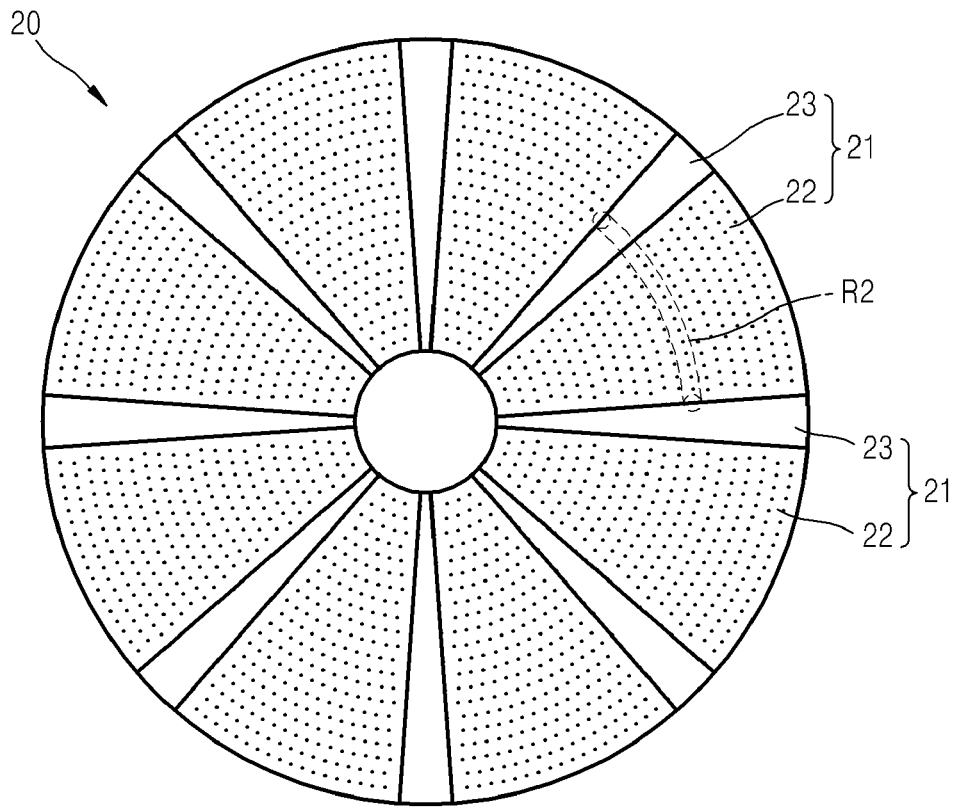
FIG. 7 illustrates the physical structure of a magnetic recording medium according to another embodiment of the present invention.
Figure 8:
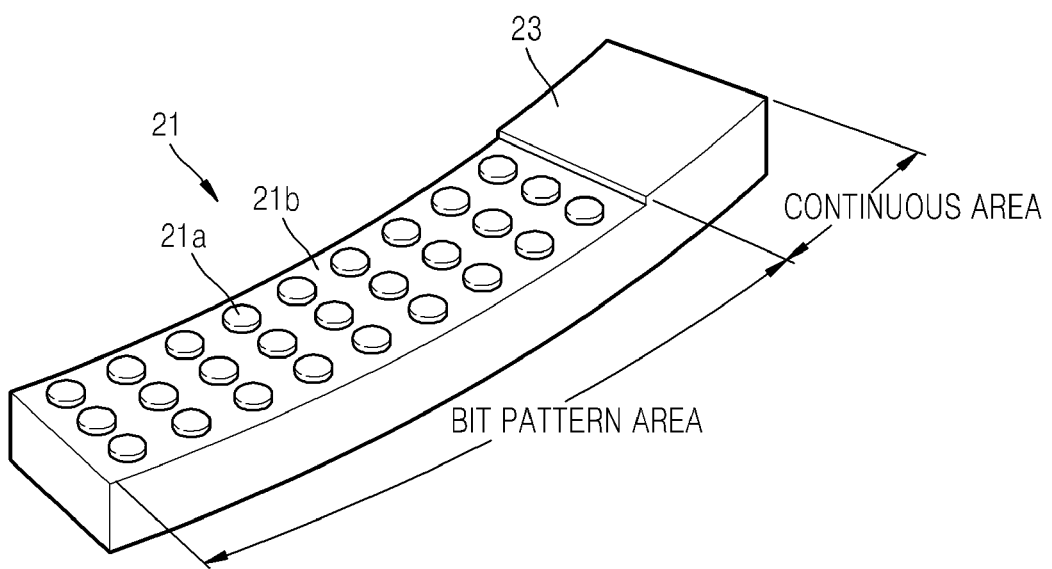
FIG. 8 is a partially enlarged perspective view of area R2 of FIG. 7.
Figure 9:
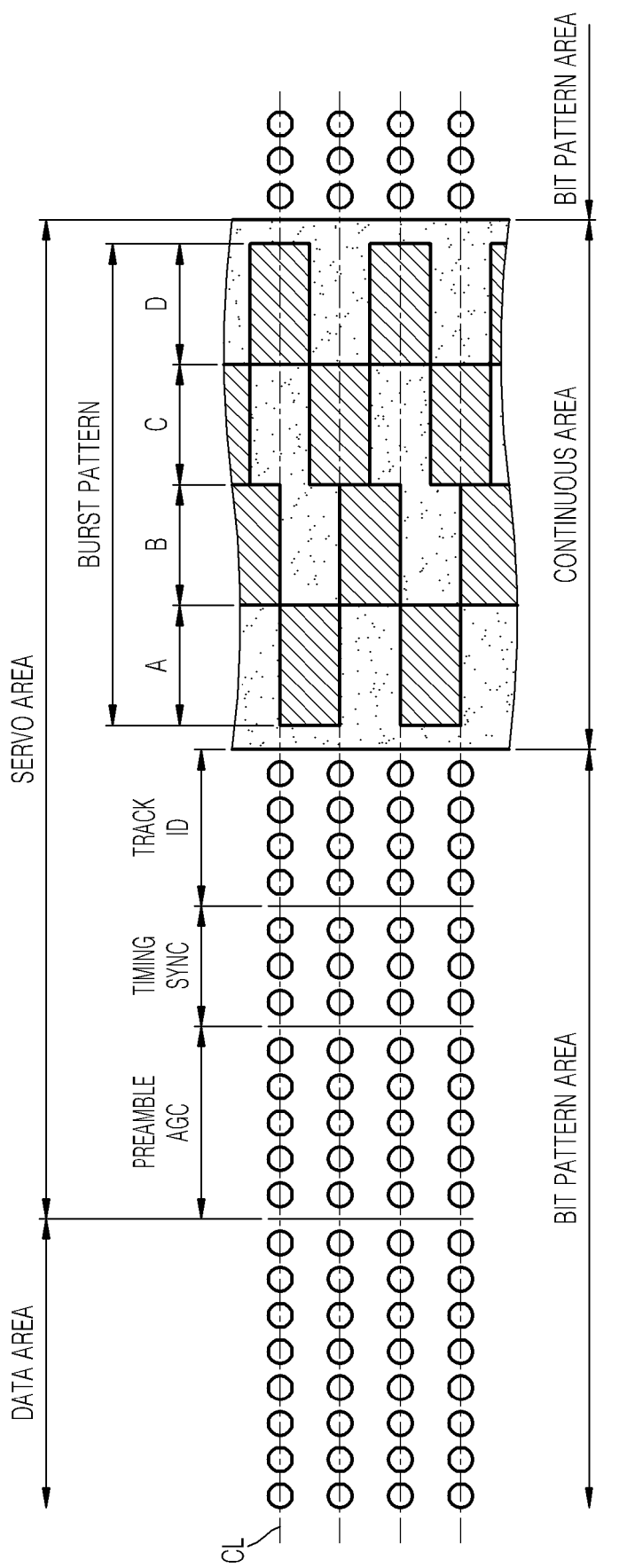
FIG. 9 illustrates the data structure of the magnetic recording medium of FIG. 7.

Next, referring to FIGS. 7 through 9, the magnetic recording media according to another embodiment of the present invention is described. FIG. 7 illustrates the physical structure of a magnetic recording medium 20 according to another embodiment of the present invention. FIG. 8 is a partially enlarged perspective view of the area R2 of FIG. 7.

Referring to FIGS. 7 and 8, the structure of the magnetic recording medium 20 according to the present embodiment is substantially the same as the physical structure of the magnetic recording medium described with reference to FIGS. 3 and 4 except for the pattern area. The recording surface of the magnetic recording medium 20 is divided equiangularly into a plurality of sectors 21. Each of the sectors 21 includes a bit pattern area 22 and a continuous area 23.

The bit pattern area 21 is formed of a non-continuous magnetic body in both direction of a crosstrack direction and a downtrack direction. The non-continuous magnetic body can be a bit dot 21a that is the minimum unit of magnetic recording obtained by patterning user data. The separation area 22b surrounding the bit dot 21a is empty or filled with a non-magnetic material to magnetically separate the bit dot 21a. The bit pattern area 22 minimizes the magnetic effect between the neighboring bit dots 21a and reduces the bit size to increase a recording density. The bit dots 21a forming a row make a data track.

FIG. 9 illustrates the recording surface of a magnetic recording layer where a servo pattern is written. Referring to FIG. 9, the recording surface of the magnetic recording layer is divided into a data area and a servo area. The servo area includes a continuous area and a part of a bit pattern area. The data area consists of the remaining part of the bit pattern area.

User information is recorded on the data track of the data area. Pre-servo pattern information is written to the data track of the servo area while a servo pattern is written to the continuous area of the servo area. The pre-servo pattern information includes preamble auto gain control (AGC), timing sync, and track ID.

The servo pattern is arranged, for example, in a crosstrack direction at a predetermined interval and can be a burst pattern formed of a plurality of bursts arranged deviated from one another in a downtrack direction. Referring to FIG. 9, the burst pattern includes A, B, C, and D bursts. The burst pattern according to the present embodiment is formed in a continuous area. That is, sections A, B, C, and D where the A, B, C, and D bursts are respectively written are located within the continuous area. For example, the A burst is formed in the section A such that the upper and lower sides of the A burst in the crosstrack direction are placed on the center lines CLs of the neighboring data tracks. The B burst is formed in the section B that deviates from the A burst as much as a track pitch interval in the crosstrack direction. The C burst is formed in the section C that deviates from the B burst in the crosstrack direction as much as a half track pitch. The D burst is formed in the section D that deviates from the C burst in the crosstrack direction as much as a track pitch. The width of each of the A, B, C, and D bursts is the pitch width of the data track, that is, the distance between the center lines CLs of the neighboring data tracks. Although in the present embodiment the burst pattern is formed of four of the A, B, C, and D bursts, the present invention is not limited thereto. For example, the burst pattern can be formed of A burst and B burst only. Other various patterns used for the continuous media can be adopted as the burst pattern of the present embodiment.

The burst patterns according to the present embodiment and modified example thereof are patterns used for a typical continuous media. Thus, a position error signal PES occurring when the magnetic head is not located on the track center line is substantially the same as that of the typical continuous media, a hard disk drive using the magnetic recording medium according to the present invention can use the magnetic head position determination method and signal processing system used for the typical continuous media as they are.

Next, a method of recording a servo pattern on a magnetic recording medium according to an embodiment of the present invention is described below. Referring to FIGS. 10 through 13B, a method of recording a servo pattern on a magnetic recording medium according to an embodiment of the present invention is described. For the convenience of explanation, a magnetic recording medium having the discrete track area shown in FIGS. 3 and 4 is presented exemplarily.

The magnetic recording medium according to the present embodiment of the present invention undergoes a servo write process after a physical manufacturing process is completed. However, since in the case of a conventional continuous medium a servo pattern is first written through the servo write process and a data track is determined according to the written servo pattern, the servo pattern can be formed at an arbitrary position on a recording surface of the magnetic recording medium. On the contrary, in the case of the magnetic recording medium according to an embodiment of the present invention, since the data track is first determined in the physical manufacturing process, the servo pattern is written according to the preformed data track. To match a reference line of the servo pattern with the preformed data track, the center position of the data track first needs to be determined. Also, to maximize the data area, it is necessary to accurately find a start position of the continuous area where the servo pattern is written.

Figure 10:
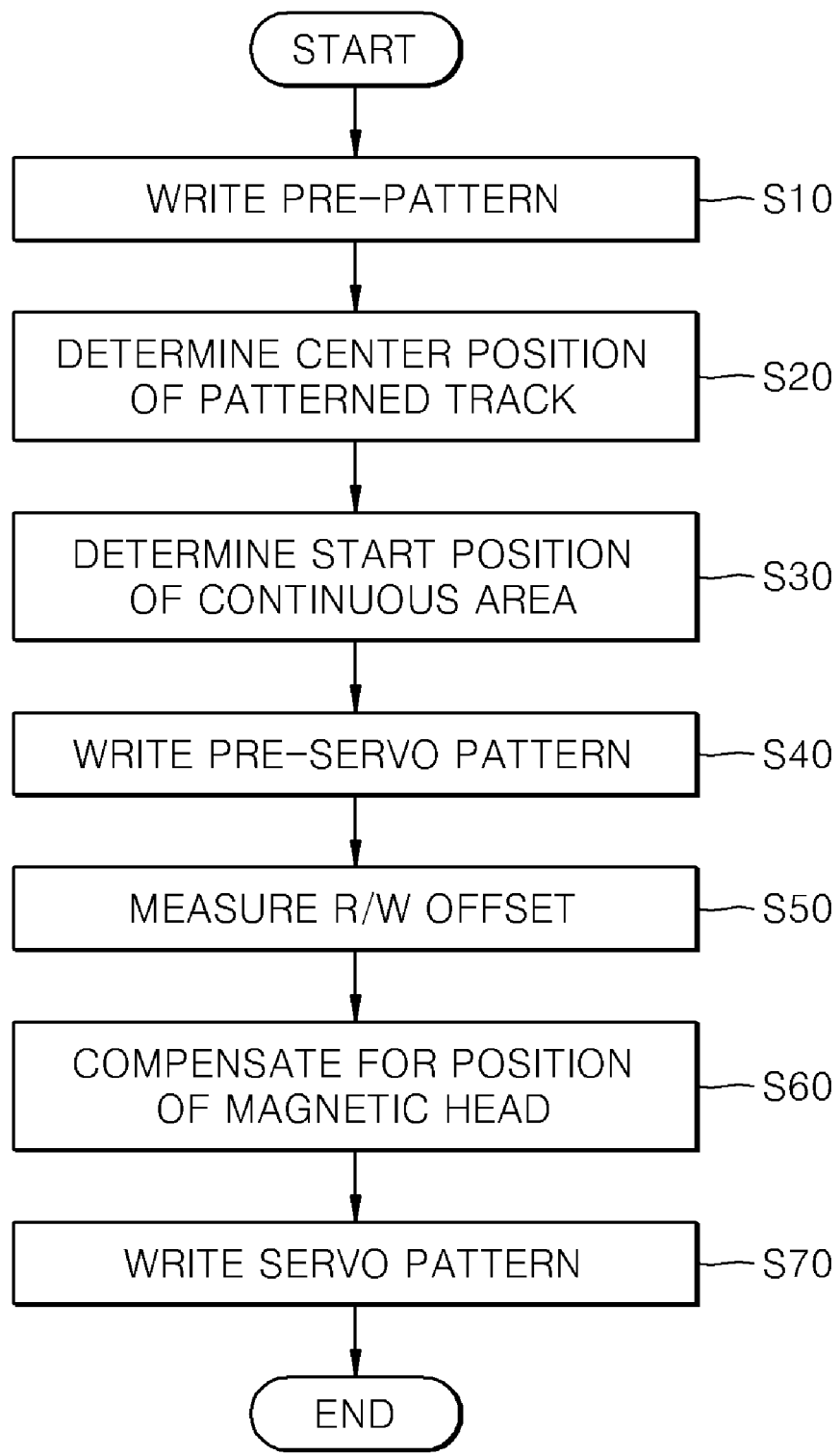
FIG. 10 is a flow chart for explaining a method of recording a servo pattern appropriate for a magnetic recording medium according to an embodiment of the present invention.

FIG. 10 is a flow chart for explaining a method of recording a servo pattern appropriate for a magnetic recording medium according to an embodiment of the present invention. Referring to FIG. 10, the method of recording a servo pattern according to an embodiment of the present invention starts from a step of recording an arbitrary pre-pattern (S10). The pre-pattern can be formed across the entire area of the recording surface of the magnetic recording medium and written with a predetermined frequency. Next, the center position of a data track is determined while a pre-pattern is being reproduced (S20) and the position where the continuous area starts is determined (S30).

Figure 11B:
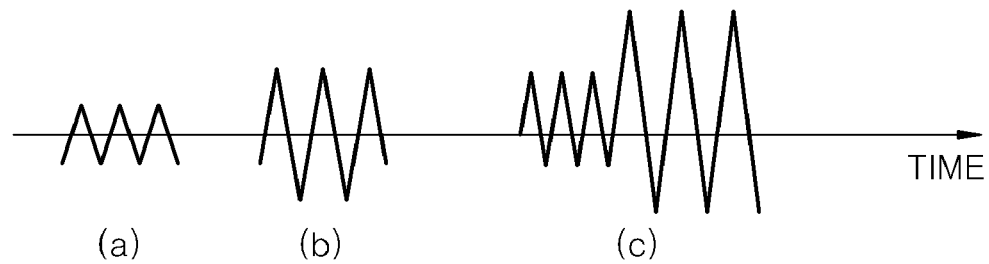
FIG. 11B illustrates a reproduction signal according to the position of the magnetic head of FIG. 11A.

FIG. 11A illustrates the positional relation of the magnetic head with respect to the magnetic recording medium where a pre-pattern is written. FIG. 11B illustrates a reproduction signal according to the position of the magnetic head of FIG. 11A. FIGS. 11A and 11B are for explaining a method of determining the center position of a data track and the start position of the continuous area from the pre-pattern. In FIG. 11A, the pre-pattern written to the data tracks #N and #N+1 are indicated by hatch marks. Also, P1, P2, and P3 indicate the position of a magnetic head, more specifically the position of a reading head.

When the magnetic head is located at the position P1, a part of the magnetic head is located at the data track and the other part of the magnetic head is located in the separation area. As a result, since the magnetic head does not completely read a pre-pattern signal written to the data track, as shown in (a) of FIG. 11B, the amplitude of a reproduction signal is relatively small. When the magnetic head is located at the position P2 that is a regular position, since the magnetic head completely reads the pre-pattern signal written to the data track, as shown in (b) of FIG. 11B, the amplitude of a reproduction signal is relatively large. Thus, when the amplitude of the reproduction signal is compared by slightly moving the position of the magnetic head in the crosstrack direction at the same position of the data track, the position where the amplitude of the reproduction signal is the maximum can be determined as the center position of the data track.

In the meantime, when the magnetic head moves from the discrete track area to the continuous area, the amplitude of the reproduction signal changes non-continuously. Referring to FIG. 11A, the width of the pre-pattern written to the data track is the same as the width of the data track. This is because the pre-pattern is not written since the separation area adjacent to the data track is an area where the magnetic recording is impossible even when a recording magnetic field of the magnetic head exceeds the width of the data track. In contrast, the overall area of the continuous area is formed of a continuous magnetic body. Since the recording magnetic field leaked from the magnetic head spreads to other areas, the width of the pre-pattern in the continuous area can be larger than that of the pre-pattern in the discrete track area. Furthermore, when the magnetic head does not record the pre-pattern at the regular position of the data track, since the recorded pre-pattern occupies only a part of the data track, the width of the recorded pre-pattern can be further decreased. Reversely, in the continuous area, since no separate data track is formed, the pre-pattern is completely recorded. Thus, when the magnetic head passes the position P3 of FIG. 11A, the amplitude of the reproduction signal increases non-continuously as shown in (c) of FIG. 11B. Thus, by specifying a point where the amplitude of the reproduction signal is non-continuously increased, the position where the continuous area starts can be determined.

Since the process of finding the center position of the data track or the start position of the continuous area through the above-described pre-pattern is substantially the same as the process of processing a typical burst signal, a detailed description about an additional circuit for interpreting the pre-pattern will be omitted herein.

Figure 12:
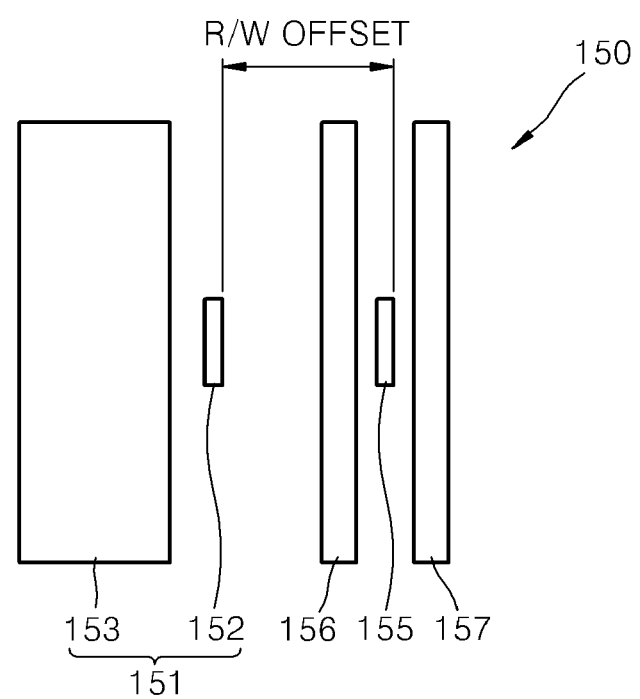
FIG. 12 illustrates an R/W offset of the magnetic head that can be applied to the servo pattern recording method according to an embodiment of the present invention.

Next, a servo pattern is written based on the center position of the data track and the start position of the continuous area found in the above operation (S70). However, the center position of the data track and the start position of the continuous area found through the operations S10 through S30 may not be accurate. Also, the magnetic head that writes the servo pattern has an R/W offset as shown in FIG. 12 so that an error may occur as the recording position of the magnetic head and the center line of the reproduction position do not match each other. Thus, as pre-operations before writing a final servo pattern, a pre-servo pattern is written (S40), an R/W offset is measured through the written pre-servo pattern (S50), and the position of the magnetic head is compensated for (S60).

The pre-servo pattern can be the same pattern as the servo patterns according to the previous embodiments. That is, the pre-servo pattern, for example, can be a pre-burst pattern formed of a plurality of pre-bursts arranged in the crosstrack direction at a predetermined interval and deviated from one another in the downtrack direction. The center position of the data track can be more accurately determined by using the pre-servo pattern. The pre-burst pattern used in the present embodiment is substantially the same as the burst pattern used for the continuous media. Thus, in the present embodiment, after determining the position where the pre-burst pattern is written, detailed pattern writing is substantially the same as the method of writing a burst pattern to the continuous media. Also, in the present embodiment, the process to determine the position of the magnetic head using the pre-burst pattern is substantially the same as the process to determine the position of the magnetic head using the burst pattern in the continuous media. Since the method of writing a burst pattern on the continuous media or the process to determine the position through the burst pattern is well known to those skilled in the art to which the present invention pertains, a detailed description about the pre-burst pattern writing method or the position determination process will be omitted herein.

Next, a method of measuring an R/W offset through a pre-servo pattern is described. FIG. 12 illustrates the relation of the positions between a writing head of a typical magnetic head and the magnetic head. Referring to FIG. 12, a magnetic head 150 includes a writing head 151 having a recording pole 152 and a return pole 153, a reading head 155, and shield layers 156 and 157 shielding a stray field intruding into the reading head 155. In the magnetic head 150, the recording pole 152 and the reading head 155 are separated a predetermined distance from each other and the distance is referred to as an R/w offset. Because of the R/W offset, the writing head 151 and the reading head 155 can deviate in the radial direction of a disk according to a change in the position of an actuator arm where the magnetic head is installed.

Figure 13A:
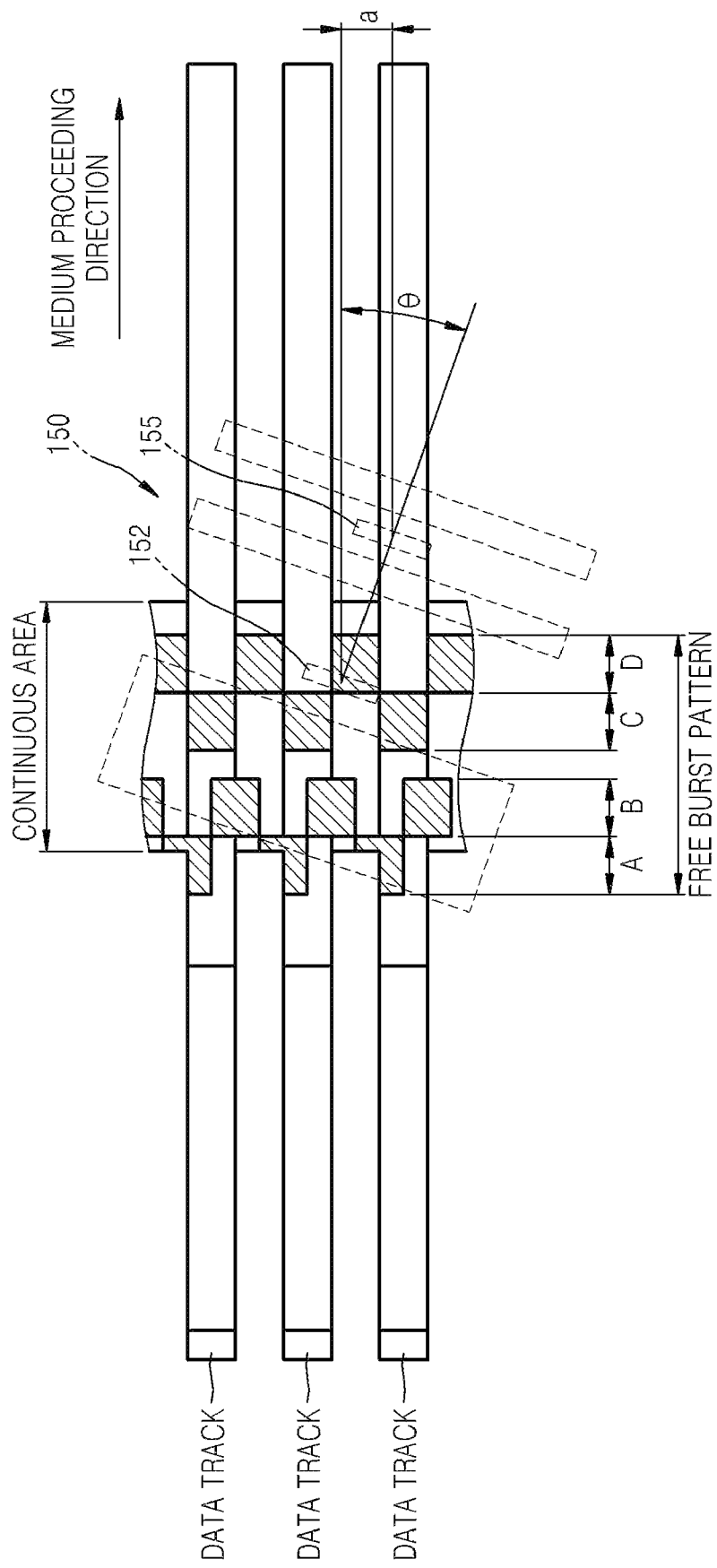
FIG. 13A illustrates a burst deviation that can be generated when a burst pattern is written by the magnetic head of FIG. 12.
Figure 13B:
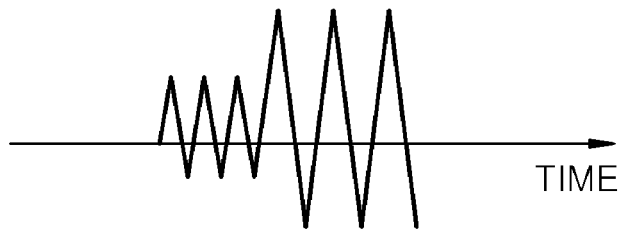
FIG. 13B illustrates a change in the reproduction signal when the burst deviation is generated in FIG. 13A.

FIG. 13A illustrates a pre-servo pattern when the center line of the magnetic head is inclined by a skew angle θ from the center line of the data track. FIG. 13B illustrates a reproduction signal with respect to the A burst that is incorrectly written in a section A in the case of FIG. 13A.

Referring to FIG. 13A, since the center line of the magnetic head is inclined by the skew angle θ with respect to a medium proceeding direction i.e. the downtrack direction, a deviation "a" is generated even when the information about the center position of the data line through the pre-pattern. The deviation "a" is given by a multiplication of the R/W offset and the sine value of the skew angle θ.

When the magnetic head is inclined toward the downtrack direction, the pre-burst pattern is written by being deviated in the crosstrack direction as much as the deviation "a". For example, when the pre-burst pattern is written in the same pattern as the servo pattern of FIG. 5, a portion of the pre-burst may be partially written over the data track in the section A. The reproduction signal of the pre-burst that is partially written in the section A changes non-continuously as shown in FIG. 13B. In the present embodiment, however, the pre-bursts in the sections B, C, and D which are the continuous area are written in a complete form with the deviation "a". Thus, the R/W offset can be measured through the pre-bursts written in the sections B, C, and D, especially in the sections C and D. The pre-burst pattern used in the present embodiment is substantially the same as the burst pattern used for the continuous media. Since the process of measuring an R/W offset using the burst pattern is well know to those skilled in the art to which the present invention pertains, a detailed description about the process of measuring an R/W offset through the pre-burst pattern will be omitted herein.

Measuring the R/W offset, correcting the position of the magnetic head according thereto, and recording a final servo pattern is performed (S70). The final servo pattern is the same as the servo patterns of the above-described embodiments. That is, the servo pattern, for example, can be a burst pattern formed of a plurality of bursts arranged in the crosstrack direction at a predetermined interval and deviated from one another in the downtrack direction. The burst pattern used in the present embodiment is substantially the same as the burst pattern used for the continuous media. Thus, in the present embodiment, after determining the position where the burst pattern is written, detailed pattern writing is substantially the same as the method of writing a burst pattern to the continuous media. Since the method of writing a burst pattern on the continuous media is well known to those skilled in the art to which the present invention pertains, a detailed description about the burst pattern writing method will be omitted herein.

Figure 14:
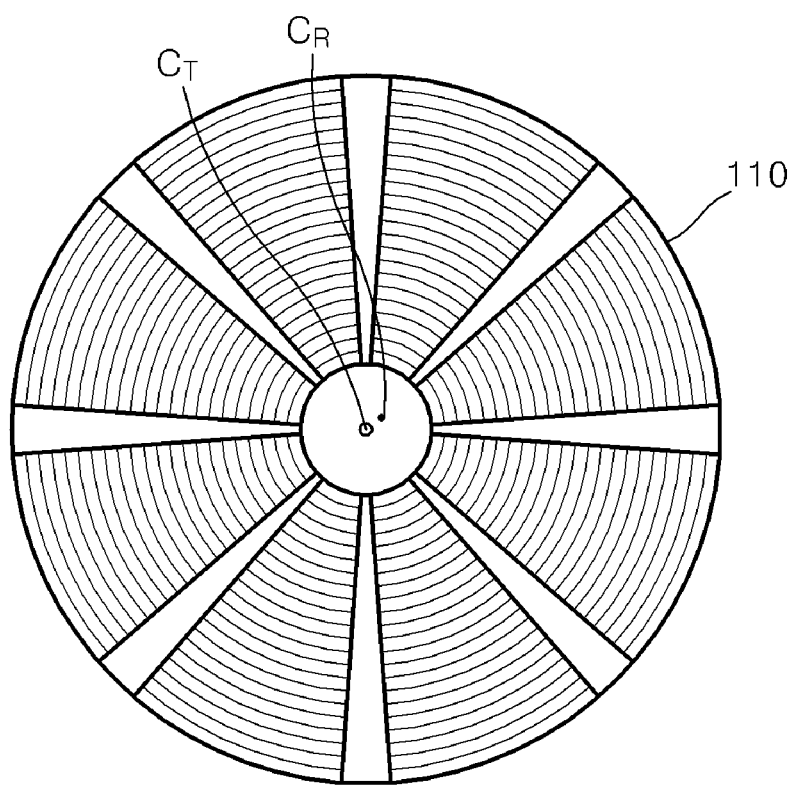
FIG. 14 illustrates that the data track center point and the rotation center point of the magnetic recording medium according to the present invention are not the same.
Figure 15:
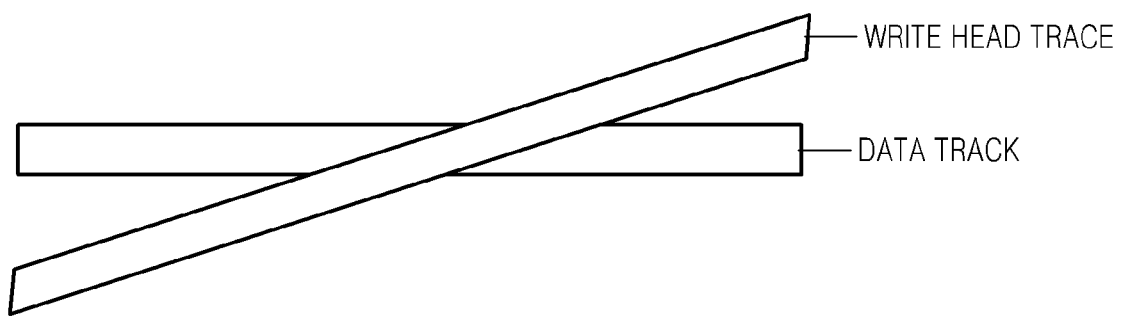
FIG. 15 illustrates the relation between the data track and the writing head trace when the data track center point and the rotation center point of FIG. 14 are not the same.
Figure 16:
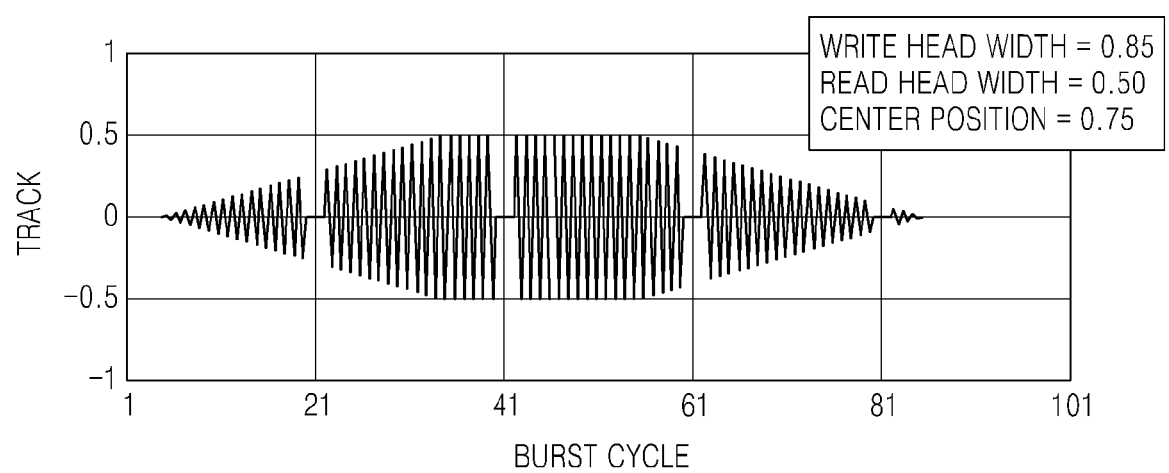
FIG. 16 illustrates a signal waveform of a burst pattern written to the magnetic recording medium in FIG. 15.

Next, referring to FIGS. 14 through 19, a magnetic head appropriate for writing a servo pattern on the magnetic recording medium according to the present invention is described below. FIG. 14 illustrates a case when eccentricity is generated in the case of the magnetic recording medium according to the present invention. FIG. 15 illustrates the trace of the writing head when the eccentricity is generated. FIG. 16 illustrates a reproduction waveform of a servo pattern when the width of the track is 1, the width of the writing head is 0.85, the width of the reading head is 0.5, and the deviation of the center position is 0.75.

Figure 20:
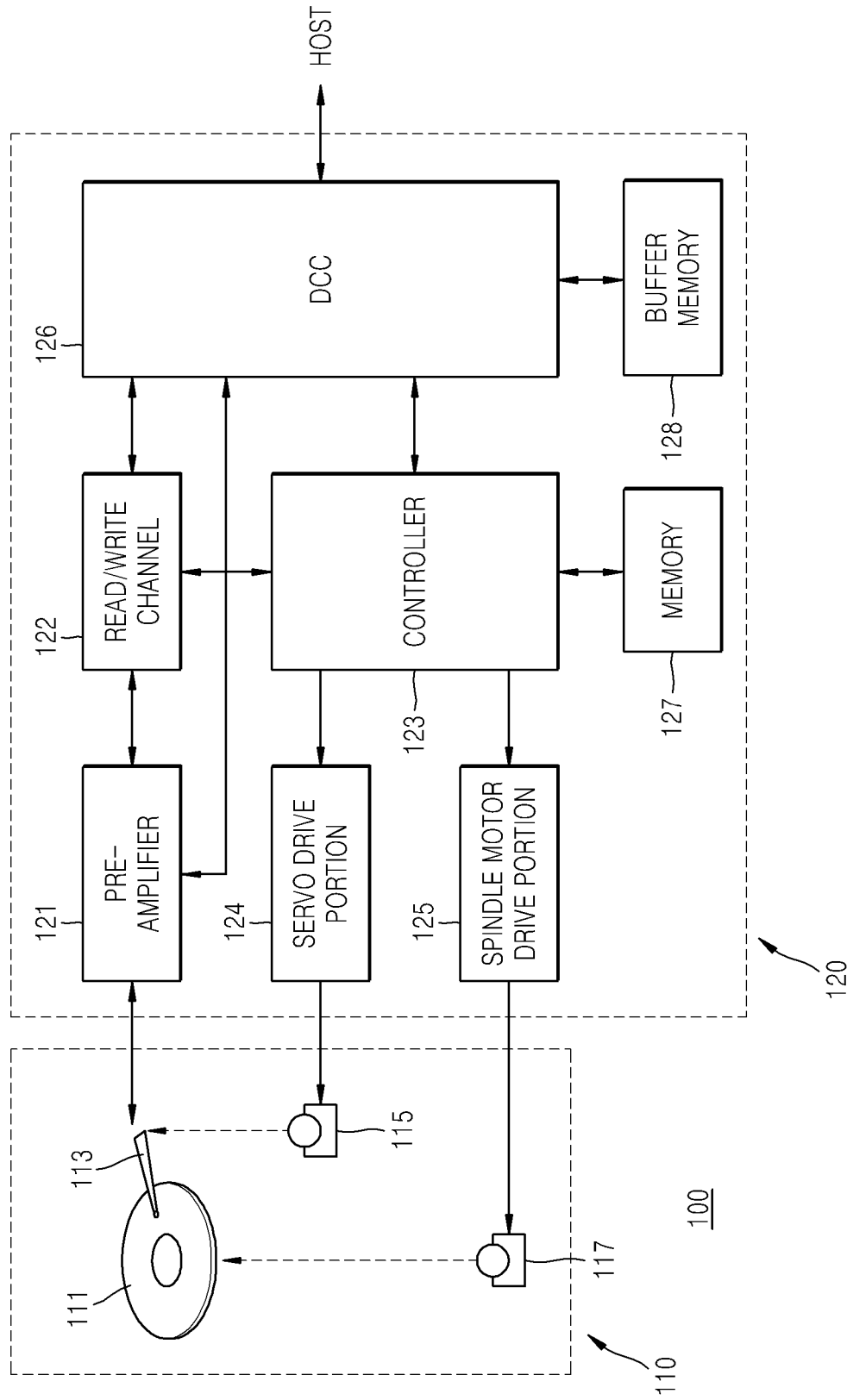
FIG. 20 is a block diagram of a system for recording a servo pattern on the magnetic recording medium according to an embodiment of the present invention.

As shown in FIG. 14, in the magnetic recording medium according to the present embodiment, since the data track is already determined in the manufacturing operation, the track center $C_T$ of the magnetic recording medium does not correspond to the data track and the rotation center $C_R$ of the magnetic recording medium rotated by a spindle motor 117 (as shown in FIG. 20) due to manufacturing tolerances. When the width of the data track has a size of several nanometers to tens of nanometers, the track center $C_T$ and the rotation center $C_R$ do not match each other so that eccentricity occurs. In this case, as shown in FIG. 15, the trace of the writing head deviates from the data track so that the servo pattern written by the writing head can be very weakly written or not be written at all as shown in FIG. 16. As the pre-pattern is incorrectly written due to the eccentricity, it is difficult to accurately determine the position of the data track or the position of the continuous area. Furthermore, the pre-servo pattern or servo pattern cannot be correctly written.

Figure 17:
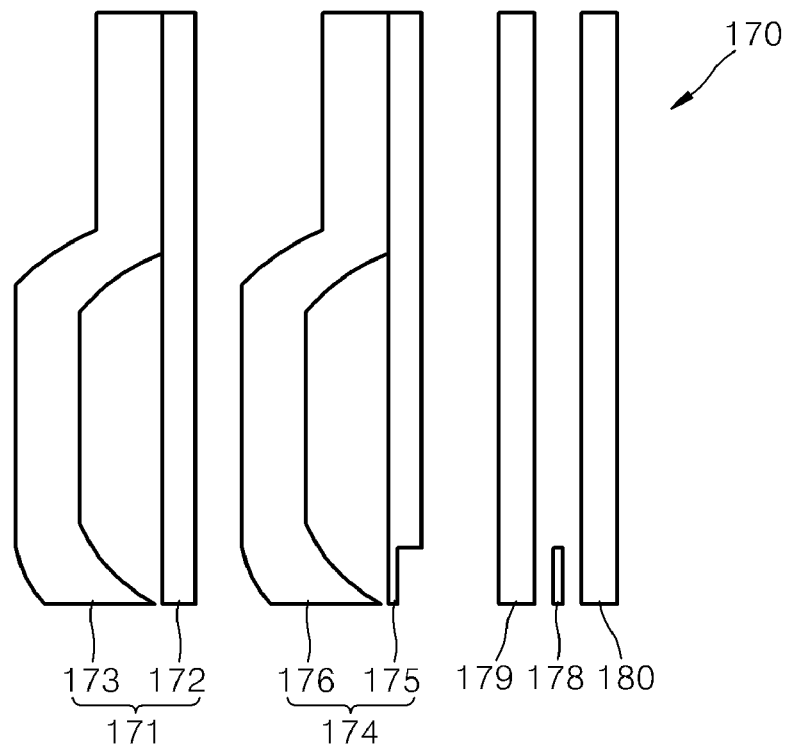
FIGS. 17 and 18 are respectively a side sectional view and a bottom view of a magnetic head appropriate for writing a servo pattern on the magnetic recording medium according to an embodiment of the present invention.
Figure 18:
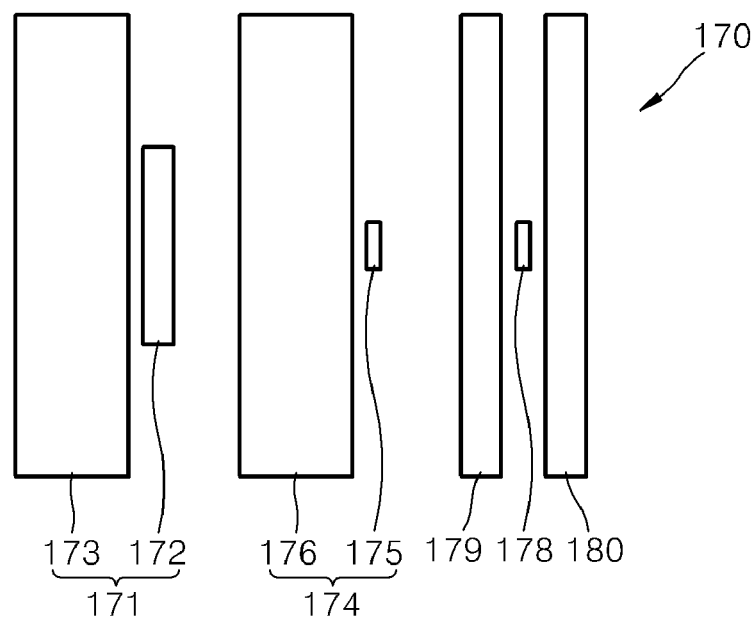
Figure 19:
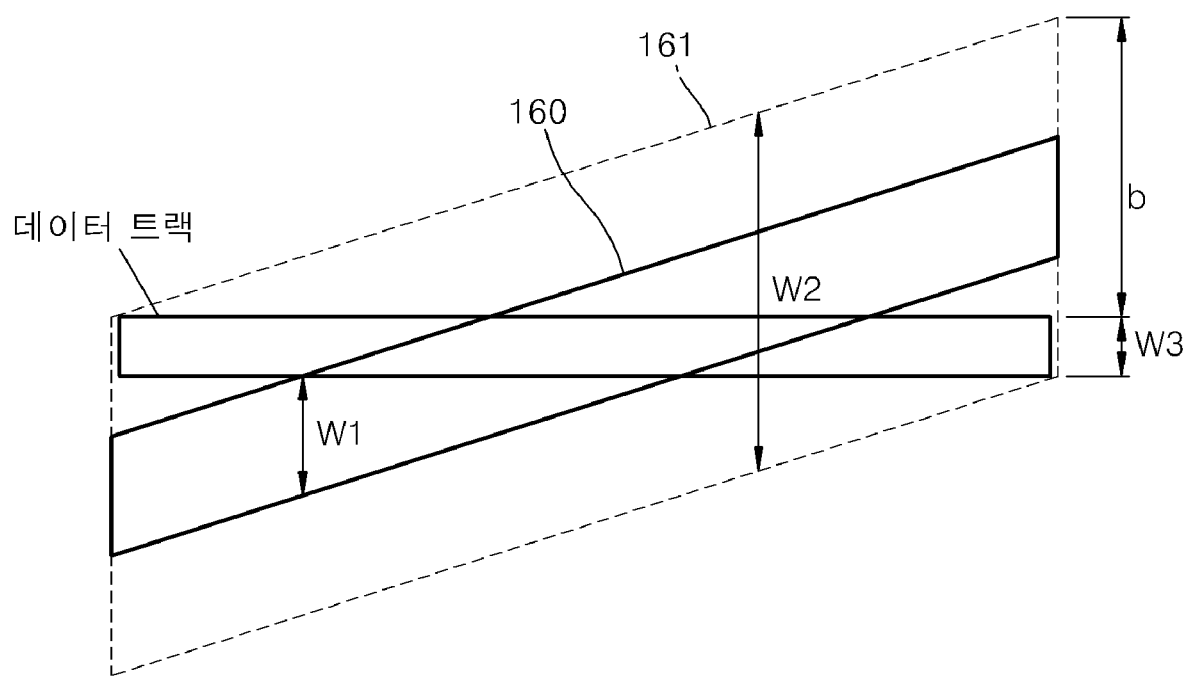
FIG. 19 illustrates the relation between the width of a servo writing head of the magnetic head of FIGS. 17 and 18 and the eccentricity of the magnetic recording medium.

Referring to FIGS. 17 through 19, a magnetic head which can write a servo pattern even when eccentricity occurs in the magnetic recording medium is described below. FIGS. 17 and 18 are respectively a side sectional view and a bottom view of a magnetic head. FIG. 19 illustrates the relation between the width of a servo writing head and the eccentricity of the magnetic recording medium.

A magnetic head 170 according to an embodiment of the present invention includes a servo writing head 171, a data writing head 174, and a reading head 178. Reference numerals 179 and 180 are shield layers shielding the intrusion of a stray magnetic field. The servo writing head 171 includes a servo recording pole 172 and a servo return pole 173. The data writing head 174 includes a data recording pole 175 and a data return pole 176. The width (W2 of FIG. 19) of the servo recording pole 172 is larger than the width (W1 of FIG. 19) of the data recording pole 175.

When the eccentricity occurs in the magnetic recording medium, the trace of the writing head periodically changes with respect to the data track as the magnetic recording medium rotates. Referring to FIG. 19, an eccentricity "b" is the maximum change width of the trace of the writing head in the crosstrack direction. In FIG. 19, the width of the data recording pole i, the width of the servo recording pole, and the track width of the data track are respectively indicated as W1, W2, and W3. W2 is larger than W1 or W3. Further, even when the magnetic head deviates from the center of the data track due to the eccentricity, W2 is preferably equals to or greater than a length obtained by adding W3 and the eccentricity "b" so that the servo recording pole can always cover the data track. When the above servo writing head is used, even if the eccentricity may occur in the magnetic recording medium, the pre-pattern described with reference to FIG. 11A can be correctly written to the data area.

FIG. 20 is a block diagram of a system for recording a servo pattern on the magnetic recording medium according to an embodiment of the present invention. Referring to FIG. 20, a servo pattern recording system 100 according to an embodiment of the present invention includes a head disk assembly 110 formed of mechanical parts and a circuit portion 120.

The head disk assembly 110 includes a magnetic recording medium 111 rotated by a spindle motor 117 and an actuator. The magnetic recording medium according to the above-described embodiment of the present invention is used as the magnetic recording medium 111. A detailed description about the magnetic recording medium 111 will be omitted herein. The actuator includes a head stack assembly 113 having a slider (not shown) where a magnetic head (not shown) is mounted and a voice coil motor VCM 115 driving the head stack assembly 113. Although the magnetic head described with reference to FIGS. 17 through 19 can be used as the magnetic head mounted on the head stack assembly 113, the present invention is not limited thereto.

The circuit portion 120 includes a pre-amplifier 121, a read/write channel 122, a controller 123, a servo drive portion 124, a spindle motor drive portion 125, a disk data controller (DDC) 126, a memory 127, and a buffer memory 128.

The pre-amplifier 121 records coded recording data applied from the read/write channel 122 on the magnetic recording medium 111 using the magnetic head, for recording, and pre-amplifies a signal picked up by the magnetic head and applies an analog reproduction signal to the read/write channel 122, for reproduction. The read/write channel 122 detects and decodes a data pulse from the reproduction signal applied by the pre-amplifier 121 and sends the decoded signal to the DDC 126, and encodes the recording data applied by the DDC 126 and sends the encoded recording data to the pre-amplifier 121. The DDC 126 records the data received from a host computer (not shown) on the magnetic recording medium through the read/write channel 122 and the pre-amplifier 121 or reads out data from the magnetic recording medium and transmits the read data to the host computer. The DDC 126 interfaces communications between the host computer and the controller 123. The buffer memory 128 temporarily stores data transmitted among the host computer, the controller 123, and the read/write channel 122. The controller 123 controls the DDC 126 in response to a reproduction or recording command received from the host computer and controls track search and track following. The memory 127 stores programs and various setting values of the controller 123. The servo drive portion 124 drives the VCM 115 by generating a drive current to drive the actuator according to a signal for controlling the position of the magnetic head generated by the controller 123. The actuator moves the magnetic head to the recording surface of the magnetic recording medium 111 in response to the direction and level of the drive current applied by the servo drive portion 124. The spindle motor drive portion 125 drives the spindle motor 117 to rotate the magnetic recording medium 111 according to a control value for controlling the rotation of the magnetic recording medium 111.

For example, the data about the pre-pattern, pre-servo pattern, or servo pattern is sent from the host computer to the DDC 126. The sent data is recorded on the magnetic recording medium through the read/write channel 122 and the pre-amplifier 121. Since the center position of the data track or the start position of the continuous area to write the servo pattern to the magnetic recording medium 111 has to be determined, the pre-pattern or pre-servo pattern is read by the magnetic head. The pick-up signal is sent to the controller 122 and the DDC 126 through the pre-amplifier 121 and the read/write channel 122. The controller 123 drives the servo drive portion 124 using a program stored in the memory 127 based on the pre-pattern or pre-servo pattern so that the servo pattern can be recorded at an appropriate position.

The method of reading out the position where the servo pattern is to be written through the pre-pattern, the method of determining the position of the magnetic head through the pre-servo pattern, or the method of determining an R/W offset and correcting the position using the determined R/W offset does not differ much from a method used in a driving apparatus using a conventional continuous medium. Thus, the servo pattern can be recorded on the magnetic recording medium according to the present invention without changing much the circuit portion of the servo pattern recording system of the conventional continuous medium.

As described above, the magnetic recording medium according to the present invention, the method of recording the servo pattern on the magnetic recording medium, and the magnetic head appropriate for the magnetic recording medium have the following advantages.

First, the servo pattern used for the conventional continuous medium can be written to the magnetic recording medium according to the present invention without many changes. The method of recording a servo pattern on the magnetic recording medium can be used for recording a servo pattern on a conventional continuous medium without many changes.

Second, since the servo pattern written to the magnetic recording medium according to the present invention is substantially the same as the servo pattern used for the typical continuous medium, the servo pattern writing method according to the present invention can be used without changing much the method and system of determining the position of the magnetic head using the servo pattern used for a drive apparatus for the conventional continuous medium.

Third, the magnetic head according to the present invention can stably write a servo pattern on the magnetic recording medium even when the magnetic recording medium is eccentric.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A magnetic recording medium comprising:
a disk substrate; and
a magnetic recording layer formed on one surface or both surfaces of the disk substrate,
wherein the magnetic recording layer includes at least one pattern area forming a plurality of data tracks in which a position for magnetic recording is patterned with a magnetic body and at least one continuous area formed of a continuous magnetic body, and at least a first part of a servo pattern for following the data track is recorded in the continuous area and a second part of the servo pattern is recorded in the pattern area.

2. The magnetic recording medium of claim 1, wherein the continuous area is provided in at least one sector with respect to the center of the disk substrate.

3. The magnetic recording medium of claim 1, wherein the servo pattern is a burst pattern formed of a plurality of bursts arranged in a crosstrack direction at a predetermined interval and deviating from one another in a downtrack direction.

4. The magnetic recording medium of claim 3, wherein a recording surface of the magnetic recording layer is divided into at least one data area where user data is recorded and at least one servo area where servo information is recorded, the data area is formed of at least a part of the pattern area, and the servo area includes the continuous area.

5. The magnetic recording medium of claim 4, wherein the servo area is provided in at least one sector with respect to the center of the disk substrate.

6. The magnetic recording medium of claim 4, wherein the servo area further comprises a pre-burst area where pre-burst servo information is recorded.

7. The magnetic recording medium of claim 1, wherein the data tracks are magnetically separated in a crosstrack direction of the disk substrate and formed of a continuous magnetic body in a downtrack direction.

8. The magnetic recording medium of claim 7, wherein a separation area that magnetically separates the data tracks is empty or filled with a non-magnetic material.

9. The magnetic recording medium of claim 1, wherein the data tracks are formed of a plurality of non-continuous magnetic bodies which are magnetically separated in a crosstrack direction and a downtrack direction of the disk substrate.

10. The magnetic recording medium of claim 9, wherein one bit is assigned to each of the non-continuous magnetic bodies.

11. The magnetic recording medium of claim 9, wherein a separation area that magnetically separates the non-continuous magnetic body is empty or filled with a non- magnetic material.

12. A magnetic recording medium comprising:
a disk substrate; and
a magnetic recording layer formed on one surface or both surfaces of the disk substrate,
wherein the magnetic recording layer includes at least one pattern area forming a plurality of data tracks in which a position for magnetic recording is patterned with a magnetic body and at least one continuous area formed of a continuous magnetic body, and at least a part of a servo pattern for following the data track is recorded in the continuous area, wherein the servo pattern is a burst pattern formed of a plurality of bursts arranged in a crosstrack direction at a predetermined interval and deviating from one another in a downtrack direction, wherein a recording surface of the magnetic recording layer is divided into at least one data area where user data is recorded and at least one servo area where servo information is recorded, the data area is formed of at least a part of the pattern area, and the servo area includes the continuous area, wherein the servo area further comprises a pre-burst area where pre-burst servo information is recorded, and wherein the pre-burst area is provided in the pattern area.

13. The magnetic recording medium of claim 12, wherein the pre-servo pattern information includes at least one of a preamble, a timing sync, and a track ID.

14. A magnetic recording medium comprising:

a disk substrate; and a magnetic recording layer formed on one surface or both surfaces of the disk substrate, wherein the magnetic recording layer includes at least one pattern area forming a plurality of data tracks in which a position for magnetic recording is patterned with a magnetic body and at least one continuous area formed of a continuous magnetic body, and at least a part of a servo pattern for following the data track is recorded in the pattern area.

* * * * *